(12) United States Patent  
Smith et al.

(10) Patent No.: US 7,436,518 B1  
(45) Date of Patent: Oct. 14, 2008

(54) RESTORATION OF FIZEAU FTS SPECTRAL DATA USING LOW AND/OR ZERO SPATIAL RESOLUTION MICHELSON FTS DATA

(75) Inventors: Eric H. Smith, San Jose, CA (US); Richard L. Kendrick, Santa Clara, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 164 days.

(21) Appl. No.: 11/582,439

(22) Filed: Oct. 18, 2006

Related U.S. Application Data

(60) Provisional application No. 60/729,748, filed on Oct. 25, 2005.

(51) Int. Cl.  
*G01B 9/02* (2006.01)

(52) U.S. Cl. ..................................................... 356/451

(58) Field of Classification Search ................ 356/451, 356/452, 454, 456  
See application file for complete search history.

(56) References Cited

U.S. PATENT DOCUMENTS

| | | | |
|---|---|---|---|
| 5,159,489 A | * | 10/1992 | Massie et al. ................ 359/419 |
| 7,034,945 B2 | | 4/2006 | Kendrick et al. |
| 7,092,103 B1 | | 8/2006 | Kendrick et al. |
| 7,119,955 B1 | * | 10/2006 | Sigler et al. .................. 359/423 |

FOREIGN PATENT DOCUMENTS

WO WO-2004-011963 2/2004

\* cited by examiner

*Primary Examiner*—Hwa S Lee (Andrew)  
(74) *Attorney, Agent, or Firm*—McDermott Will & Emery LLP

(57) ABSTRACT

A Fourier Transform Spectrometer ("FTS") system includes a Fizeau FTS having a plurality of sub-collecting elements, adjacent ones of which are separated by a gap distance, and at least one of which has an adjustable optical path. The FTS system further includes a Michelson FTS having an adjustable optical path. The FTS system further includes one or more processors configured to select spectral data collected by the Fizeau FTS corresponding to spatial frequencies for which the Fizeau FTS has a modulation transfer function ("MTF") value above a first threshold level, to select spectral data collected by the Michelson FTS corresponding to spatial frequencies for which the Michelson FTS has a MTF value above a second threshold level, and to combine the selected spectral data from the Fizeau FTS with the selected spectral data from the Michelson FTS.

26 Claims, 8 Drawing Sheets

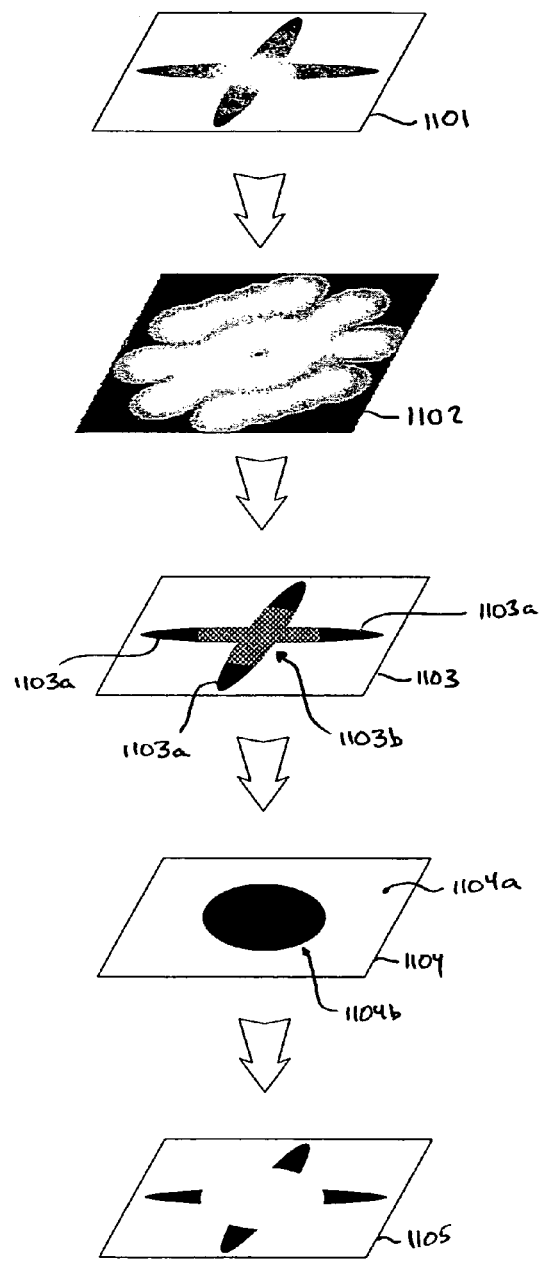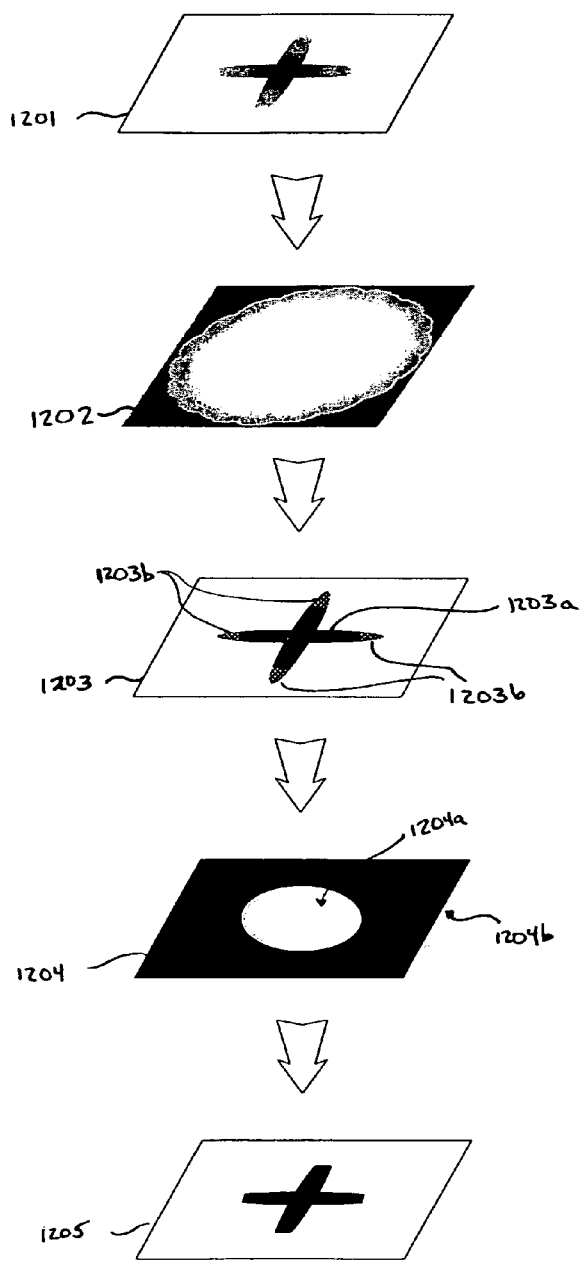

RESTORATION OF FIZEAU FTS SPECTRAL DATA USING LOW AND/OR ZERO SPATIAL RESOLUTION MICHELSON FTS DATA

CROSS-REFERENCE TO RELATED APPLICATION

The present application claims the benefit of priority under 35 U.S.C. § 119 from U.S. Provisional Patent Application Ser. No. 60/729,748 entitled "RESTORATION OF FIZEAU FTS SPECTRAL DATA USING LOW-SPATIAL-RESOLUTION MICHELSON FTS DATA," filed on Oct. 25, 2005, the disclosure of which is hereby incorporated by reference in its entirety for all purposes.

STATEMENT REGARDING FEDERALLY SPONSORED RESEARCH OR DEVELOPMENT

Not applicable.

FIELD OF THE INVENTION

The present invention generally relates to Fourier transform spectroscopy and, more particularly, relates to the restoration of low spatial frequency Fizeau Fourier Transform Spectrometer spectral data.

BACKGROUND OF THE INVENTION

When extracting spectral information from a radiation source, Fourier transform spectroscopy is often used. Currently, Fourier transform spectrometers only provide limited ranges of spatial frequencies in which their response (i.e., their ability to collect spectral data) is acceptable. For example, Fizeau Fourier transform spectrometers tend to exhibit poor responses in low and zero spatial frequencies. Various approaches to restoring the spectral data missing from the spatial frequencies in which a Fizeau Fourier transform spectrometer has a poor response include estimation based upon prior knowledge of the scene being imaged, or computationally intensive approximation using known image processing techniques. These approaches provide, at best, only approximations of the missing data.

Accordingly, there is a need for a method to restore the spectral data corresponding spatial frequencies in which a Fizeau Fourier transform spectrometer has a poor response. The present invention satisfies this need and provides other advantages as well.

SUMMARY OF THE INVENTION

In accordance with the present invention, low and zero spatial frequency spectral data collected by a Michelson Fourier transform spectrometer ("FTS") is combined with the higher spatial frequency spectral data collected by a Fizeau FTS. Prior to combining, the spectral data from each FTS is normalized with reference to the modulation transfer function ("MTF") of each FTS to ensure a good match between the dynamic ranges of both spectral data sets.

According to one embodiment of the present invention, a FTS system includes a Fizeau FTS having a plurality of sub-collecting elements. Adjacent ones of the plurality of sub-collecting elements are separated by a gap distance, and at least one of the plurality of sub-collecting elements has an adjustable optical path. The FTS system further includes a Michelson FTS with a collecting element having an adjustable optical path. The FTS system further includes one or more processors configured to perform the steps of selecting spectral data collected by the Fizeau FTS corresponding to a first plurality of spatial frequencies for which the Fizeau FTS has a modulation transfer function value above a first threshold level, selecting spectral data collected by the Michelson FTS corresponding to a second plurality of spatial frequencies for which the Michelson FTS has a modulation transfer function value above a second threshold level, and combining the selected spectral data collected by the Fizeau FTS with the selected spectral data collected by the Michelson FTS.

According to another embodiment of the present invention, a method of restoring low spatial frequency spectral information to an image using a Fizeau FTS and a Michelson FTS includes the steps of selecting spectral data collected by the Fizeau FTS corresponding to a first plurality of spatial frequencies for which the Fizeau FTS has a modulation transfer function value above a first threshold level, selecting spectral data collected by the Michelson FTS corresponding to a second plurality of spatial frequencies for which the Michelson FTS has a modulation transfer function value above a second threshold level, and combining the selected spectral data collected by the Fizeau FTS with the selected spectral data collected by the Michelson FTS.

According to another embodiment of the present invention, a machine-readable medium carries one or more sequences of instructions for restoring low spatial frequency spectral information to an image using a Fizeau FTS and a Michelson FTS. Execution of the one or more sequences of instructions by one or more processors causes the one or more processors to perform the steps of selecting spectral data collected by the Fizeau FTS corresponding to a first plurality of spatial frequencies for which the Fizeau FTS has a modulation transfer function value above a first threshold level, selecting spectral data collected by the Michelson FTS corresponding to a second plurality of spatial frequencies for which the Michelson FTS has a modulation transfer function value above a second threshold level, and combining the selected spectral data collected by the Fizeau FTS with the selected spectral data collected by the Michelson FTS.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 11 schematically illustrates the normalization and selection of spectral data from a Fizeau lambda image according to one aspect of the present invention;

FIG. 12 schematically illustrates the normalization and selection of spectral data from a Michelson lambda image according to one aspect of the present invention;

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

One approach to Fourier transform spectroscopy involves collecting spectral data with a Fizeau interferometer, in which separate portions of a collected wavefront are interfered with each other to form interference patterns on an image plane. As the optical path length of one of the separate portions of the collected wavefront is changed, a phase delay is introduced between the portions, causing interference patterns to translate across the image plane. These interference patterns are collected and Fourier transformed to extract spectral fringe visibility data for all field points. Because the optical transfer function ("OTF") of a Fizeau interferometer is given by the cross-correlation of separate apertures, however, low and zero spatial frequency ("DC") information is missing from the resultant Fourier transform.

Figure 1:
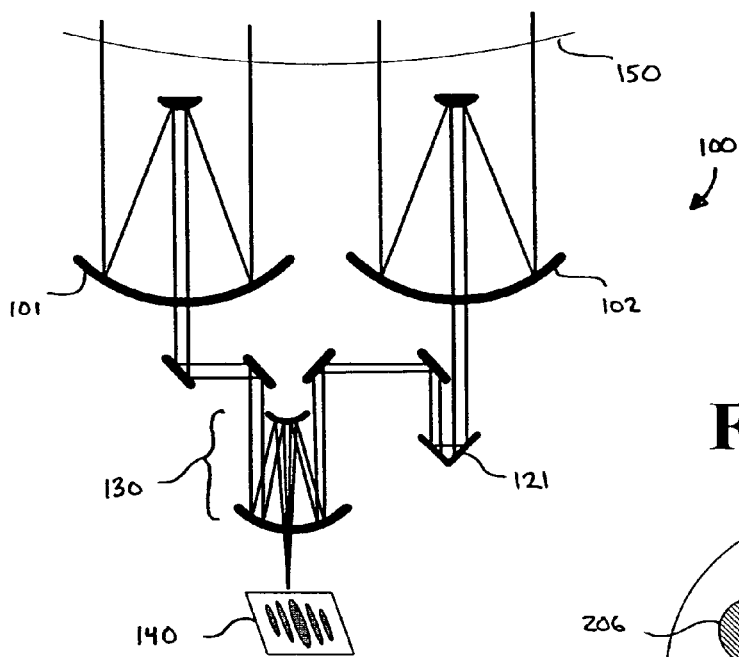
FIG. 1 illustrates a Fizeau Fourier transform spectrometer according to one aspect of the present invention.

FIG. 1 depicts such a Fizeau Fourier transform spectrometer ("FTS") 100 according to one aspect of the present invention. Fizeau FTS 100 includes multiple sub-collecting elements 101 and 102, for collecting different regions of an incident wavefront 150. At least one of the sub-collecting elements, in this case sub-collecting element 102, includes a path length adjustment device 121 for adjusting the optical path length of the incident radiation gathered by sub-collecting element 102. Fizeau FTS 100 further includes combiner optics, such as combiner telescope 130, for combining the incident radiation collected by sub-collecting elements 101 and 102 and interfering the radiation on an image plane to generate interference patterns such as interference pattern 140.

While Fizeau FTS 100 has been illustrated as including two sub-collecting elements, the scope of the present invention includes Fizeau FTS systems with any number of sub-collecting elements greater than one. In embodiments in which an Fizeau FTS of the present invention includes more than two sub-collecting elements, the sub-collecting elements may be associated into two or more groups of elements for the purpose of interfering the collected portions of an incident wavefront. The optical path length of each sub-collecting element in a group will remain the same as the optical path length of every other sub-collecting element in the group. Accordingly, to generate interference patterns, the optical path lengths of one or more of the groups will be varied with respect to another one of the groups.

Figure 2:
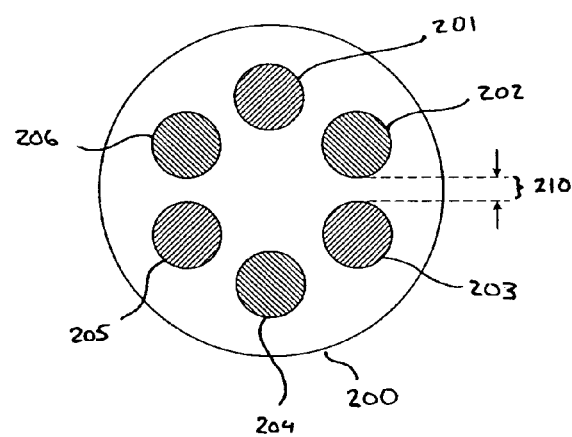
FIG. 2 illustrates the arrangement of sub-collectors of a Fizeau Fourier transform spectrometer according to one aspect of the present invention.

For example, FIG. 2 illustrates an arrangement of sub-collecting elements of a Fizeau FTS 200 according to one aspect of the present invention. Fizeau FTS 200 includes six sub-collecting elements 201-206. Sub-collecting elements 201, 203 and 205 comprise one group, and sub-collecting elements 202, 204 and 206 comprise a second group. Each of sub-collecting elements 202, 204 and 206 has an adjustable path length, so that the group comprising these sub-collecting elements can be interfered with the group comprising sub-collecting elements 201, 203 and 205. Between adjacent sub-collecting elements 202 and 203 is a gap distance 210. Gap distances between other adjacent sub-collecting elements may be larger, smaller, or the same size as gap distance 210. According to one aspect of the present invention, the largest gap distance (or any of the gap distances, if all are the same), may be used to determine the size of the aperture of a Michelson FTS used to restore low spatial frequency spectral data to the Fizeau FTS, as described in greater detail below with respect to FIG. 4.

Figure 3:
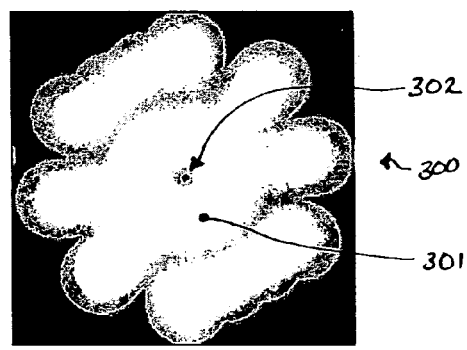
FIG. 3 illustrates the spectral optical transfer function of a Fizeau Fourier transform spectrometer according to one aspect of the present invention.

FIG. 3 graphically illustrates the optical transfer function ("OTF") 300 of Fizeau FTS 200 when used to interfere two groups of sub-collecting elements (i.e., the spectral optical transfer function). The lighter regions of OTF 300, such as region 301, correspond to spatial frequencies for which the response of Fizeau FTS 200 is better. The darker regions, however, such as region 302, correspond to spatial frequencies for which the response of Fizeau FTS 200 is poorer. OTF 300 is characteristic of Fizeau FTS systems, in that zero and low spatial frequencies (i.e., those near the center of OTF 300), are characterized by poor response. Thus, spectral data collected with Fizeau FTS 200 will lack both a DC component (i.e., zero spatial frequency data) and low spatial frequency information, but will include information from higher spatial frequencies (resulting in a sharply detailed image which appears "washed out" from the lack of a DC component).

Another technique for Fourier transform spectroscopy involves collecting spectral data with a Michelson interferometer, in which the amplitude of a collected wavefront is divided into two wavefronts which are interfered to form an interference pattern. The optical path length of one of the wavefronts is varied to permit the collection of intensity information from a number of interference patterns formed by the two wavefronts. This intensity information is then Fourier transformed to extract spectral information from the wavefront. Because the entire collected wavefront is interfered with itself, the resultant Fourier transform contains all the spatial frequencies contained in the OTF of the system (which is given by the auto-correlation of the pupil function of the collecting element(s) of the system). When used for Fourier transform spectroscopy, a Michelson interferometer exhibits good response at low and zero spatial frequencies, but poorer response in higher spatial frequencies, resulting in a "blurry" image.

Figure 4:
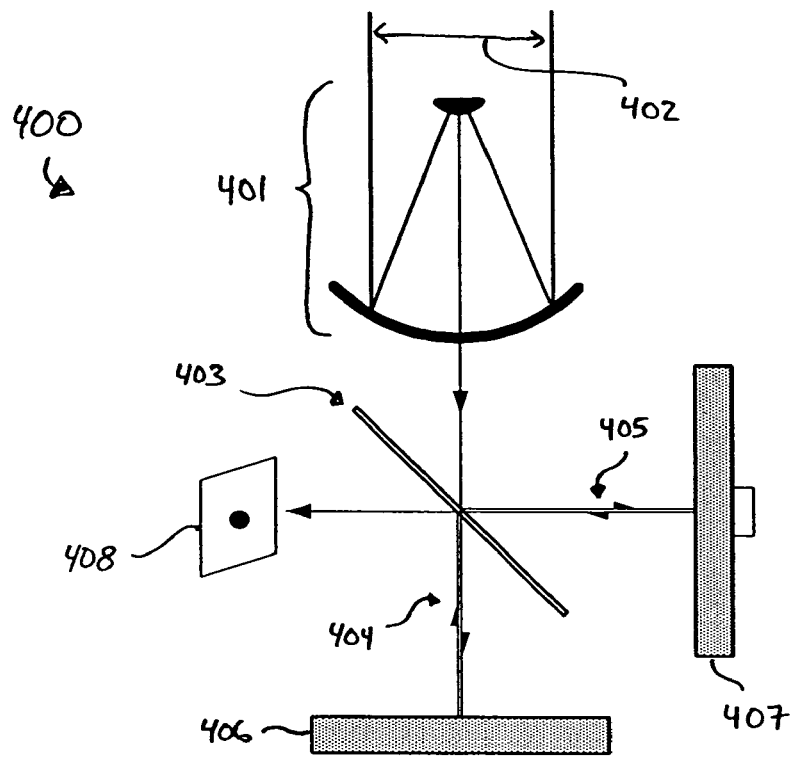
FIG. 4 illustrates a Michelson Fourier transform spectrometer according to one aspect of the present invention.

Turning to FIG. 4, such a Michelson FTS 400 is illustrated according to one aspect of the present invention. Michelson FTS 400 includes a collecting element 401 with an aperture 402 whose cross-correlation covers the DC and low spatial frequencies of interest (i.e., those spatial frequencies missing from the data collected by the Fizeau FTS). According to one aspect, aperture 402 may be larger than the largest gap distance 210 of Fizeau FTS 200. An incoming wavefront collected by collecting element 401 is split by a beamsplitter 403 into a first sub-signal 404 and a second sub-signal 405. First sub-signal 404 is reflected by a fixed mirror 406 back to beamsplitter 403. Meanwhile, second sub-signal 405 is reflected by an adjustable mirror 407 back to beamsplitter 403. Beamsplitter 403 combines first sub-signal 404 and second sub-signal 405 (which has now traveled a different optical path length than first sub-signal 404) to form an interference pattern 408 at an image plane of Michelson FTS 400.

Figure 5:
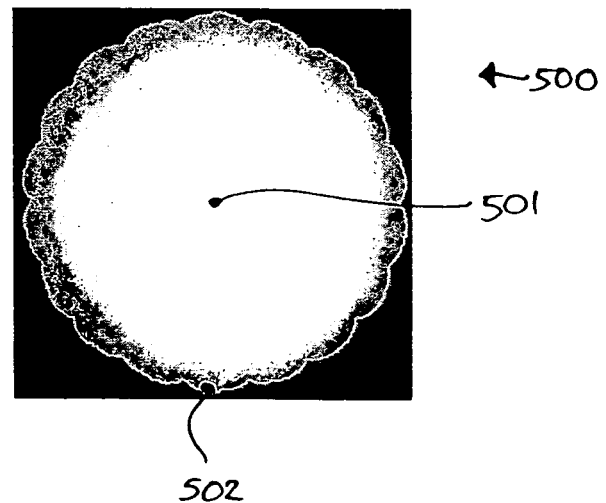
FIG. 5 illustrates the optical transfer function of a Michelson Fourier transform spectrometer according to one aspect of the present invention.

FIG. 5 graphically illustrates the optical transfer function ("OTF") 500 of Michelson FTS 400. The lighter regions of OTF 500, such as region 501, correspond to spatial frequencies for which the response of Michelson FTS 400 is better. The darker regions, however, such as region 502, correspond to spatial frequencies for which the response of Michelson FTS 400 is poorer. OTF 500 is characteristic of Michelson FTS systems, in that zero and low spatial frequencies (i.e., those near the center of OTF 500), are characterized by a better response than higher spatial frequencies. Thus, spectral data collected with Michelson FTS 400 will include both a DC component and low spatial frequency information, but will lack information from higher spatial frequencies (resulting in a "blurry" image lacking in detail).

Figure 6:
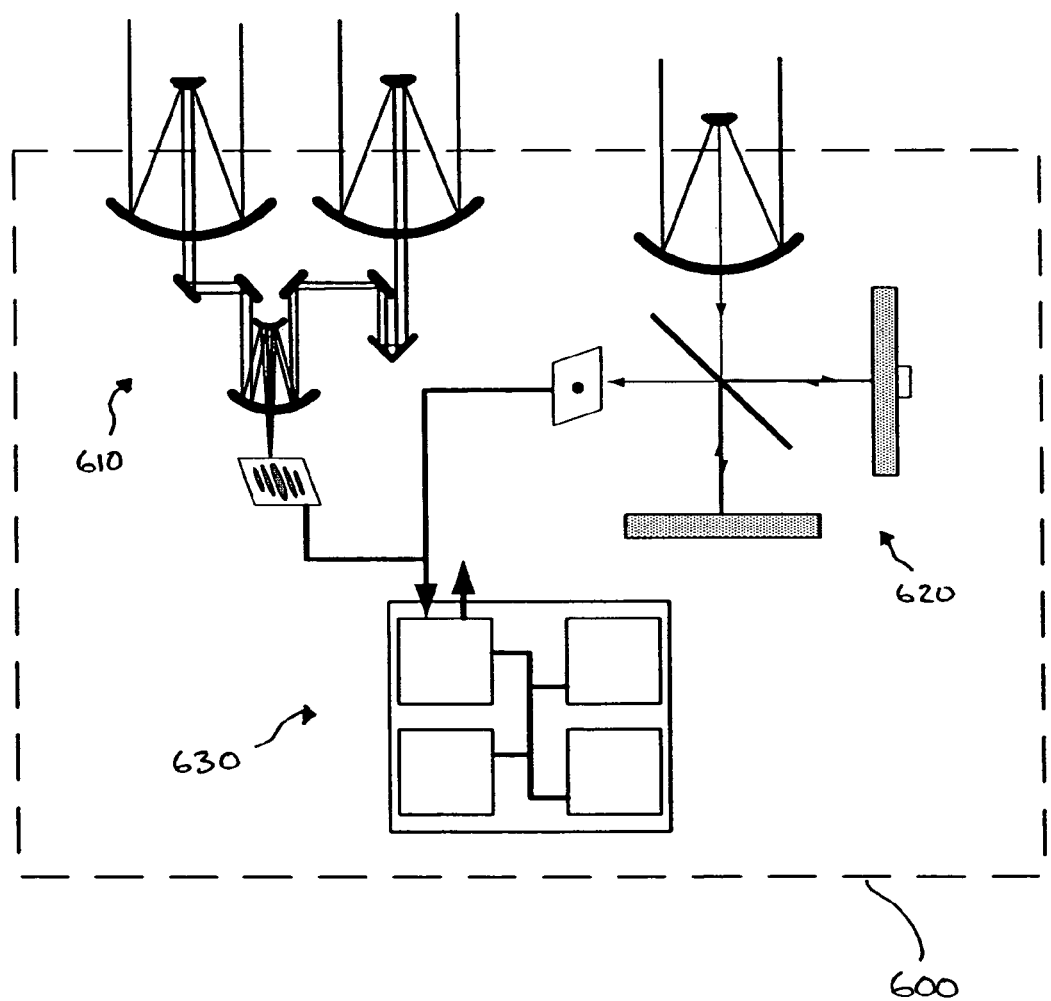
FIG. 6 illustrates a Fourier transform spectrometer system according to one embodiment of the present invention.

The present invention overcomes the deficiencies of both Michelson FTS systems and Fizeau FTS systems by providing an FTS system including both a Michelson FTS and a Fizeau FTS, along with one or more processors configured to combine the spectral data collected by both the Michelson and Fizeau FTS systems. FIG. 6 illustrates such a FTS system 600, according to one embodiment of the present invention. FTS system 600 includes a Fizeau FTS 610 with a plurality of sub-collecting elements, as described in greater detail above with respect to FIGS. 1 and 2. FTS system 600 further includes a Michelson FTS 620 with a collecting element having an aperture whose cross-correlation covers the DC and low spatial frequencies of interest. For example, the aperture may be larger than a largest one of the gap distances between adjacent sub-collecting elements of Fizeau FTS 610, as discussed in greater detail above with respect to FIG. 4. Both the Fizeau FTS 610 and Michelson FTS 620 output interference patterns to one or more processors, such as processor 630. Processor 630 is configured to combine the spectral data from Fizeau FTS 610 and Michelson FTS 620 in the following manner.

Figure 7:
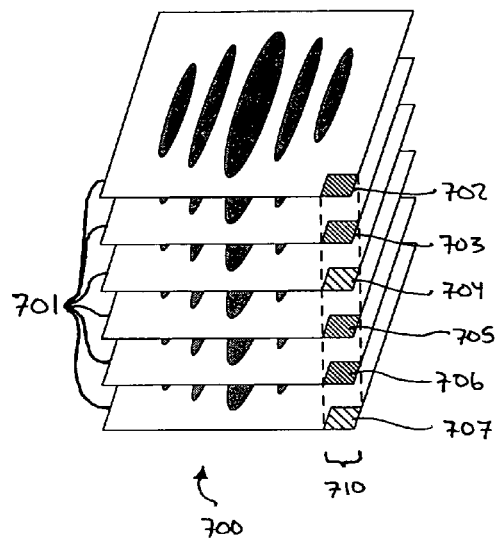
FIG. 7 illustrates a delta cube of interference patterns according to one aspect of the present invention.
Figure 8:
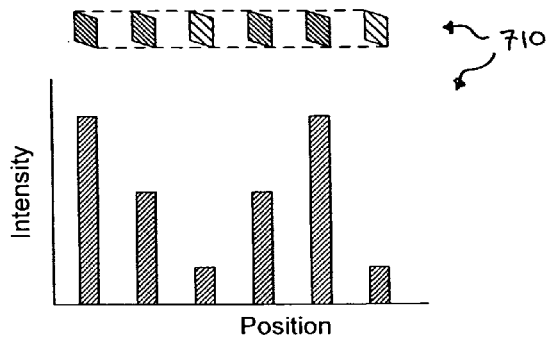
FIG. 8 illustrates a delta column according to one aspect of the present invention, in both graphical and x-y plot formats.

Processor 630 generates a delta cube of Michelson interference patterns collected by the Michelson FTS 620. Such a delta cube 700 is illustrated in FIG. 7. Each of the Michelson interference patterns 701 in the Michelson delta cube 700 includes a plurality of pixels, such as pixels 702-707. Each Michelson interference pattern 701 corresponds to a particular optical path length difference between the sub-signals of the Michelson FTS 620. Pixels 702-707 correspond to the same pixel location in each of the interference patterns 701, thereby forming a "delta column" 710 of corresponding pixels. FIG. 8 illustrates delta column 710 both graphically and in an x-y plot format, where the intensity of each pixel is graphed with respect to the optical path length to which the interference pattern 701 containing the pixel corresponds.

Figure 10:
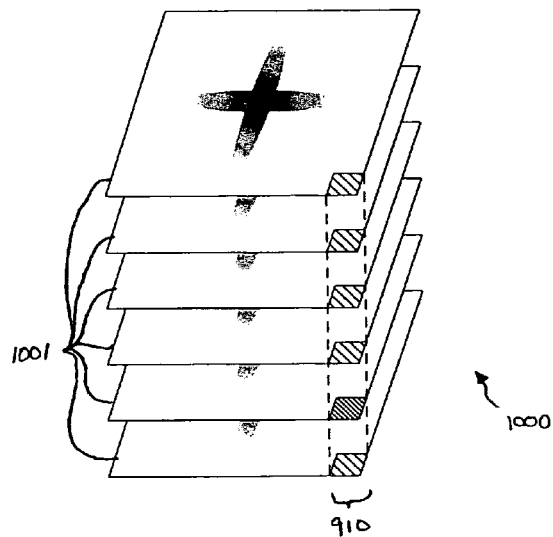
FIG. 10 illustrates a lambda cube of lambda images according to one aspect of the present invention.
Figure 9:
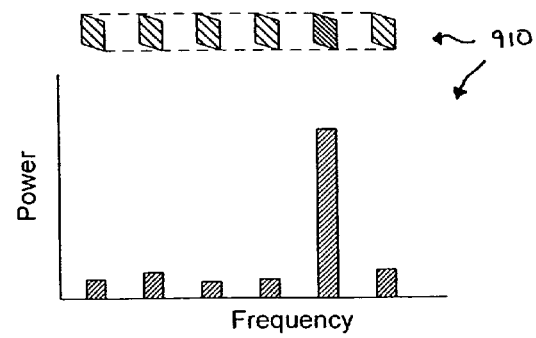
FIG. 9 illustrates a lambda column according to one aspect of the present invention, in both graphical and x-y plot formats.

Each delta column 710 contained in the delta cube is Fourier transformed to produce corresponding "lambda columns," such as lambda column 910 illustrated in FIG. 9. Lambda column 910 contains the same number of data points as delta column 710, which can be expressed either in an x-y plot format (where each data point represents the power at a particular spatial frequency), or graphically as series of pixels, corresponding to the pixels in delta column 710. By Fourier transforming each delta column in delta cube 700, a lambda cube containing a corresponding number of lambda columns can be created. FIG. 10 illustrates one such lambda cube 1000, containing the same number of lambda columns (such as lambda column 910) as delta columns in delta cube 700. Lambda cube 1000 therefore contains the same number of lambda images 1001 as delta images 701 in delta cube 700. Each lambda image 1001 includes spectral data (in a spatial frequency bin) corresponding to a single wavelength (or a small range of wavelengths) of the wavefront collected by Michelson FTS 620.

In a similar fashion, processor 630 creates a Fizeau delta cube from interference patterns collected by Fizeau FTS 610. Each Fizeau interference pattern includes a plurality of pixels and corresponds to a particular optical path length difference between the sub-collecting elements (or groups of sub-collecting elements) of Fizeau FTS 610. The Fizeau delta cube similarly includes Fizeau delta columns, which processor 630 uses to create a Fizeau lambda cube, in the same manner described above. The Fizeau lambda cube contains Fizeau lambda columns and Fizeau lambda images corresponding to the Fizeau delta columns and Fizeau interference patterns.

Next, processor 630 normalizes each lambda image in the Fizeau and Michelson lambda cubes by dividing the intensity of every pixel in each lambda image by the modulation transfer function ("MTF") of the respective FTS system. The MTF of an FTS system expresses the magnitude of the OTF of that FTS system. FIG. 11 schematically illustrates a single Fizeau lambda image 1101 being divided, pixel by pixel, by the MTF 1102 of Fizeau FTS 610. The result of this division is a normalized Fizeau lambda image 1103, in which regions 1103a of normalized Fizeau lambda image 1103 corresponding to a first plurality of spatial frequencies (e.g., those corresponding to regions in which the MTF 1102 of Fizeau FTS 610 are above a first threshold level) have been normalized. Other regions, such as region 1103b, which correspond to spatial frequencies in which the MTF is below the first threshold level, will have a larger noise component, as they have been divided by a number closer to zero. For this reason, in certain embodiments of the present invention, the normalization step will include modifying the MTF of the FTS by adding a baseline component, to avoid dividing the intensity of any pixel in a lambda image by either a very low number or by zero.

Similarly, FIG. 12 schematically illustrates a single Michelson lambda image 1201 being divided, pixel by pixel, by the MTF 1202 of Michelson FTS 620 to produce a normalized Michelson lambda image 1203. The result of this division is a normalized Michelson lambda image 1203, in which a region 1203a of normalized Michelson lambda image 1203 corresponding to a second plurality of spatial frequencies (e.g., those corresponding to regions in which the MTF 1202 of Michelson FTS 620 are above a second threshold level) has been normalized. Other regions, such as regions 1203b, which correspond to spatial frequencies in which the MTF is below the second threshold level, will have a larger noise component, as they have been divided by a number closer to zero.

Next, processor 630 selects regions from normalized Fizeau lambda image 1103 and normalized Michelson lambda image 1203 to combine. In FIG. 11, the selection of spectral data collected by Fizeau FTS 610 is schematically illustrated by mask 1104, which selects region 1104a corresponding to the first plurality of spatial frequencies (e.g., region 1103a) for which the value of MTF 1102 of Fizeau FTS 610 is above the first threshold level. This selection results in a cropped Fizeau lambda image 1105 in which the spectral data corresponding to spatial frequency regions for which the value of MTF 1102 is below the first threshold has been "cropped out." Similarly, in FIG. 12, the selection of spectral data collected by Michelson FTS 620 is schematically illustrated by mask 1204, which selects region 1204a corresponding to the second plurality of spatial frequencies (e.g., 1203a) for which the value of MTF 1202 of Michelson FTS 620 is above the second threshold level. This selection results in a cropped Michelson lambda image 1205 in which the spectral data corresponding to spatial frequency regions for which the value of MTF 1202 is below the second threshold has likewise been "cropped out."

Figure 13:
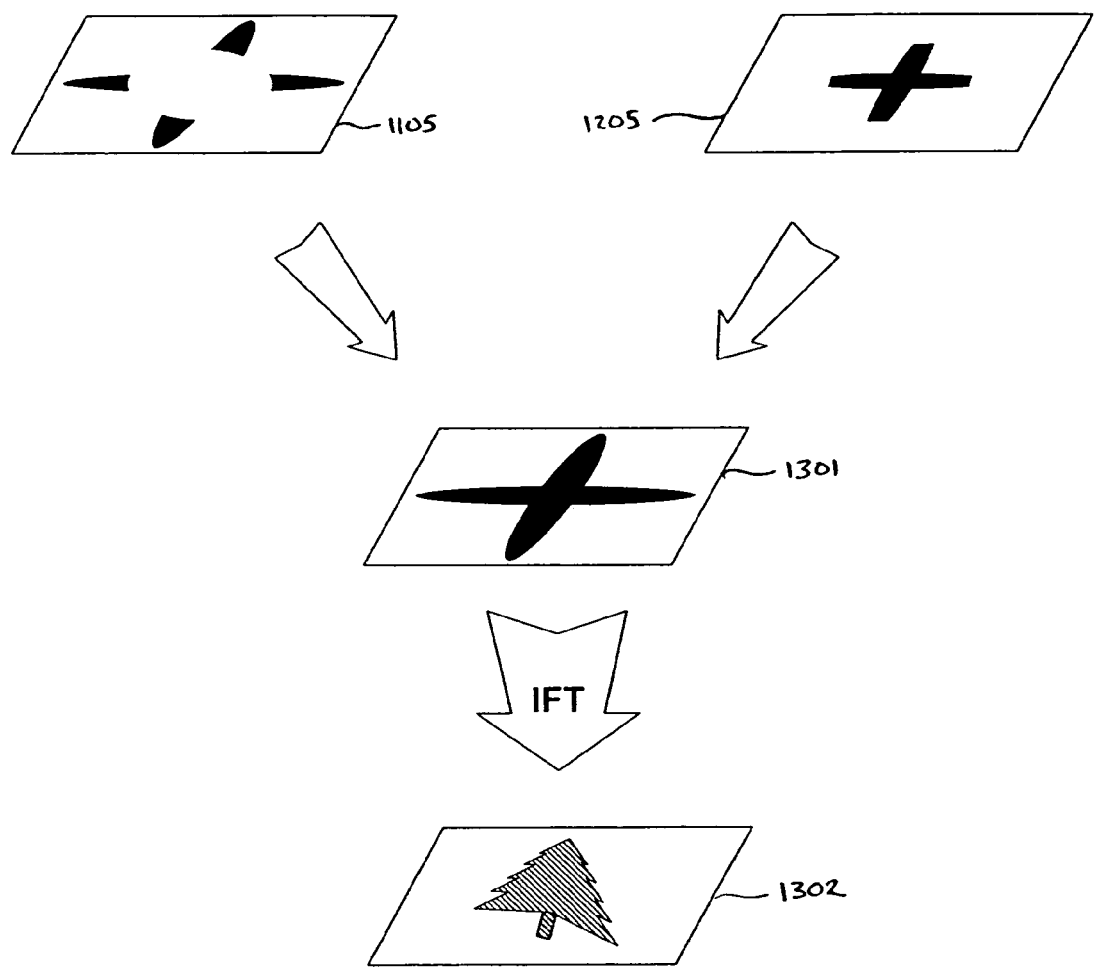
FIG. 13 schematically illustrates the combination of spectral data from a Michelson Fourier transform spectrometer and a Fizeau Fourier transform spectrometer according to one aspect of the present invention.

Finally, processor 630 combines the selected spectral data from Fizeau FTS 610 and Michelson FTS 620. FIG. 13 schematically illustrates this combination of cropped Fizeau lambda image 1105 and cropped Michelson lambda image 1205 to generate a reconstructed lambda image 1301. Processor 630 repeats the above steps for every lambda image in both lambda cubes to generate a single reconstructed lambda cube, which can then be inverse Fourier transformed to generate a plurality of monochromatic images (e.g., such as monochromatic image 1302) and/or a corresponding panchromatic image (i.e., made up of one or more of the monochromatic images).

According to one embodiment of the present invention, the first threshold level and the second threshold level (i.e., the threshold levels applied to the Fizeau and Michelson lambda images, respectively), may be the same level (e.g., only spatial frequencies for which the MTF of either FTS system is greater than 0.5 are selected). According to other embodiments, the first threshold level and the second threshold level may be different levels. Different threshold levels may be chosen to reduce or eliminate overlap between selected regions of Fizeau spectral data and Michelson spectral data, to simplify the combination thereof. Should the first and second threshold levels be selected such that there is overlap in the regions of spatial frequencies between the Fizeau and Michelson spectral data, this overlap may be handled in any one of a number of ways known to those of skill in the art. For example, the spectral data in the overlapping regions may be averaged, the spectral data corresponding to a pixel with a lower MTF may be discarded in favor of one with a higher MTF, or the spectral data corresponding to a pixel with a lower intensity may be discarded in favor of one with a higher intensity, etc.

According to one embodiment of the present invention, the optical path length adjustments of the Fizeau FTS and the Michelson FTS are selected to ensure that each Fizeau lambda image in the Fizeau lambda cube corresponds to exactly one of the Michelson lambda images in the Michelson lambda cube, thereby rendering the combination of spectral data from each lambda cube a simple matter. However, the scope of the present invention is not limited to such an arrangement. Rather, as will be apparent to one of skill in the art, the present invention has application to embodiments in which the lambda images from the Fizeau and Michelson lambda cubes do not correspond in a simple 1:1 fashion (e.g., because of a different number of optical path length adjustments between the two FTS systems, different scan lengths, etc.). In such an embodiment, the lambda cubes may be synchronized before combination. This may be done in any one of a number of ways known to those of skill in the art. For example, by taking weighted averages of two or more lambda images from one lambda cube, a composite lambda image can be created that approximately corresponds to the spectral data contained in one or more lambda images from the other lambda cube. The scope of the present invention is not limited to this particular method of synchronizing lambda images, however but rather includes any other method of synchronizing data sets known to those of skill in the art.

Figure 14:
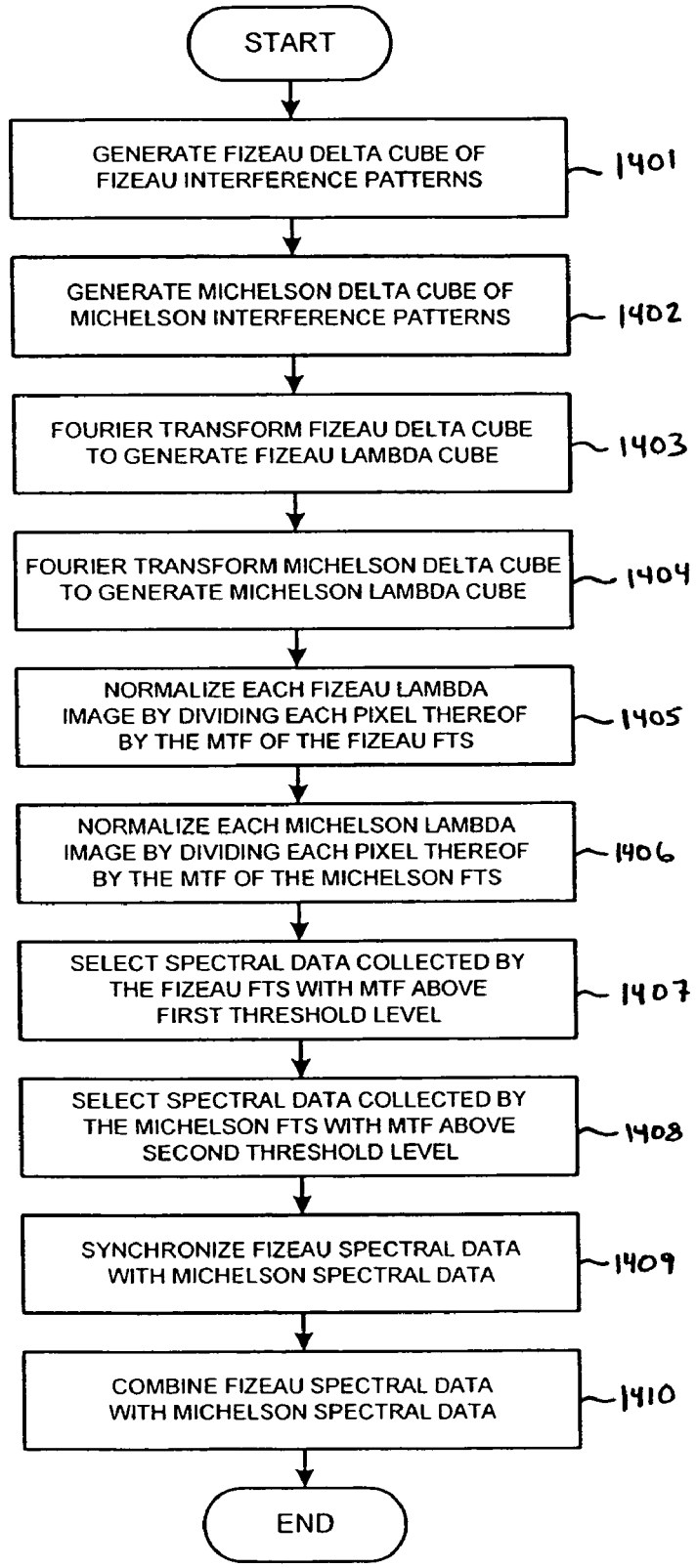
FIG. 14 is a flowchart illustrating a method of restoring low spatial frequency spectral information to an image using a Fizeau Fourier transform spectrometer and a Michelson Fourier transform spectrometer according to one embodiment of the present invention.

FIG. 14 is a flow chart illustrating a method of restoring low spatial frequency spectral information to an image using a Fizeau FTS and a Michelson FTS according to one embodiment of the present invention. The method begins with step 1401, in which the Fizeau FTS is used to generate a Fizeau delta cube of Fizeau interference patterns. In step 1402, the Michelson FTS is used to generate a Michelson delta cube of Michelson interference patterns. As will be apparent to one of ordinary skill in the art, the scope of the present invention is not limited by this order of steps, as steps 1401 and 1402 may be performed in any order, or simultaneously.

In step 1403, the Fizeau delta cube generated in step 1401 is Fourier transformed to generated a Fizeau lambda cube of Fizeau lambda images. Similarly, in step 1404, the Michelson delta cube generated in step 1402 is Fourier transformed to generated a Michelson lambda cube of Michelson lambda images. Again, as will be apparent to one of ordinary skill in the art, the scope of the present invention is not limited by this order of steps, as steps 1403 and 1404 may be performed in any order, or simultaneously.

In step 1405, each Fizeau lambda image in the Fizeau lambda cube generated in step 1403 is normalized by dividing each pixel thereof by the MTF of the Fizeau FTS. Similarly, in step 1406, each Michelson lambda image in the Michelson lambda cube generated in step 1404 is normalized by dividing each pixel thereof by the MTF of the Michelson FTS. Again, as will be apparent to one of ordinary skill in the art, the scope of the present invention is not limited by this order of steps, as steps 1405 and 1406 may be performed in any order, or simultaneously.

In step 1407, spectral data collected by the Fizeau FTS that corresponds to a first plurality of spatial frequencies for which the MTF of the Fizeau FTS is above a first threshold level is selected. Similarly, in step 1408, spectral data collected by the Michelson FTS that corresponds to a second plurality of spatial frequencies for which the MTF of the Michelson FTS is above a second threshold level is selected. Again, as will be apparent to one of ordinary skill in the art, the scope of the present invention is not limited by this order of steps, as steps 1407 and 1408 may be performed in any order, or simultaneously.

In step 1409, the Fizeau spectral data and the Michelson spectral data are synchronized, if necessary. According to one embodiment, in which each Fizeau lambda image in the Fizeau lambda cube corresponds to exactly one of the Michelson lambda images in the Michelson lambda cube, no synchronization is necessary. Where the lambda images from each lambda cube do not correspond in a simple 1:1 fashion (e.g., because of a different number of optical path length adjustments between the two FTS systems, different scan lengths, etc.), then synchronization may be accomplished by taking the weighted average of adjacent lambda images in one cube to approximate a lambda image or a weighted average of multiple lambda images from the other lambda cube, as described in greater detail above.

In step 1410, the spectral data from the Fizeau FTS and the Michelson FTS selected in steps 1407 and 1408 is combined. If there are regions of overlapping spatial frequencies in the spectral data from each FTS, this overlap may be handled in any one of a number of ways known to those of skill in the art. For example, the spectral data in the overlapping regions may be averaged, the spectral data corresponding to a pixel with a lower MTF may be discarded in favor of one with a higher MTF, or the spectral data corresponding to a pixel with a lower intensity may be discarded in favor of one with a higher intensity, etc.

Figure 15:
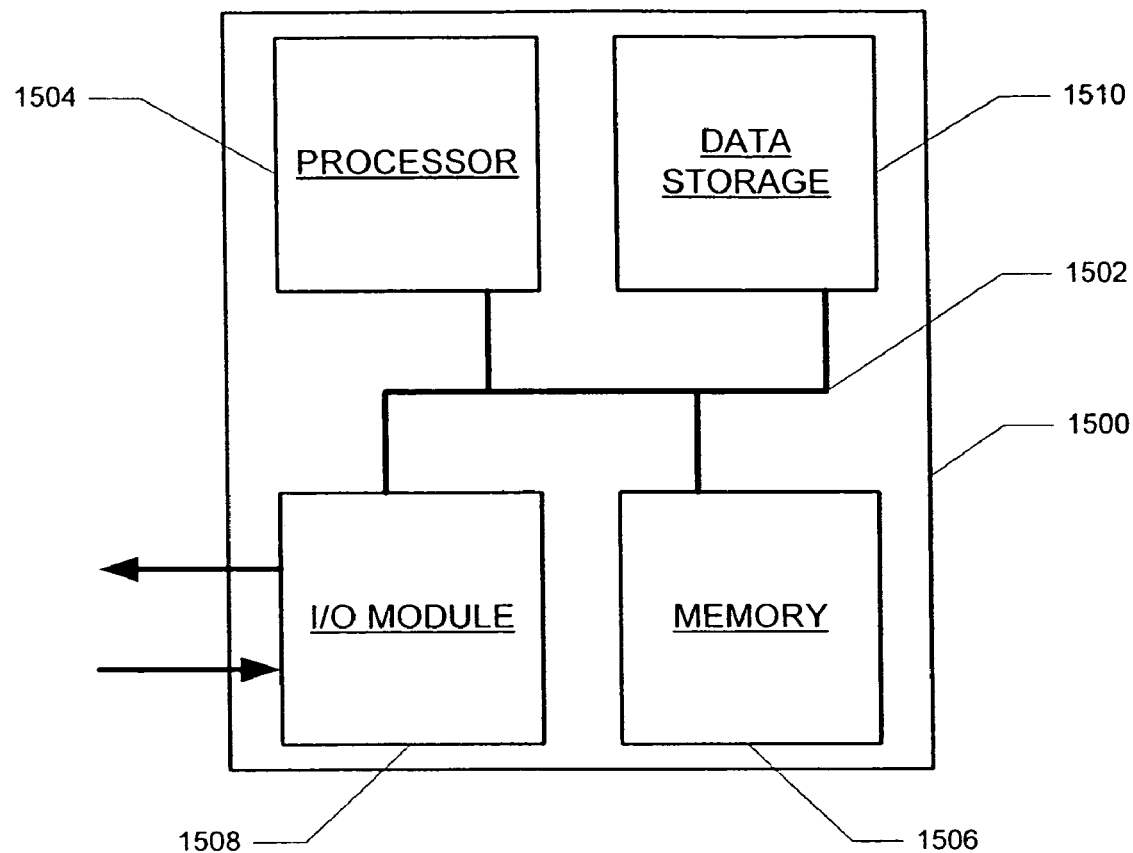
FIG. 15 is a block diagram that illustrates an exemplary computer system upon which an embodiment of the present invention may be implemented.

FIG. 15 is a block diagram that illustrates a computer system 1500 upon which an embodiment of the present invention may be implemented. Computer system 1500 includes a bus 1502 or other communication mechanism for communicating information, and a processor 1504 coupled with bus 1502 for processing information. Computer system 1500 also includes a memory 1506, such as a random access memory ("RAM") or other dynamic storage device, coupled to bus 1502 for storing information and instructions to be executed by processor 1504. Memory 1506 may also be used for storing temporary variable or other intermediate information during execution of instructions to be executed by processor 1504. Computer system 1500 further includes a data storage device 1510, such as a magnetic disk or optical disk, coupled to bus 1502 for storing information and instructions.

Computer system 1500 may be coupled via I/O module 1508 to a display device (not illustrated), such as a cathode ray tube ("CRT") or liquid crystal display ("LCD") for displaying information to a computer user. An input device, such as, for example, a keyboard or a mouse may also be coupled to computer system 1500 via I/O module 1508 for communicating information and command selections to processor 1504.

According to one embodiment of the invention, restoring low spatial frequency spectral information to an image using a Fizeau FTS and a Michelson FTS is performed by a computer system 1500 in response to processor 1504 executing one or more sequences of one or more instructions contained in memory 1506. Such instructions may be read into memory 1506 from another machine-readable medium, such as data storage device 1510. Execution of the sequences of instructions contained in main memory 1506 causes processor 1504 to perform the process steps described herein. One or more processors in a multi-processing arrangement may also be employed to execute the sequences of instructions contained in memory 1506. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 1504 for execution. Such a medium may take many forms, including, but not limited to, non-volatile media, volatile media, and transmission media. Non-volatile media include, for example, optical or magnetic disks, such as data storage device 1510. Volatile media include dynamic memory, such as memory 1506. Transmission media include coaxial cables, copper wire, and fiber optics, including the wires that comprise bus 1502. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer or other machine can read. The term "processor" as used herein refers to any device that can execute process steps, and may be comprised of one or more of hardware, firmware, or software.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

What is claimed is:

1. A Fourier transform spectrometer ("FTS") system comprising:
   a Fizeau FTS having a plurality of sub-collecting elements, adjacent ones of the plurality of sub-collecting elements separated by a gap distance, at least one of the plurality of sub-collecting elements having an adjustable optical path;
   a Michelson FTS with a collecting element having an adjustable optical path; and
   one or more processors configured to perform the steps of:
      selecting spectral data collected by the Fizeau FTS corresponding to a first plurality of spatial frequencies for which the Fizeau FTS has a modulation transfer function value above a first threshold level;
      selecting spectral data collected by the Michelson FTS corresponding to a second plurality of spatial frequencies for which the Michelson FTS has a modulation transfer function value above a second threshold level; and
      combining the selected spectral data collected by the Fizeau FTS with the selected spectral data collected by the Michelson FTS.

2. The FTS system of claim 1, wherein the first plurality of spatial frequencies and the second plurality of spatial frequencies include one or more regions of overlapping spatial frequencies.

3. The FTS system of claim 1, wherein the spectral data collected by the Fizeau FTS includes a first plurality of lambda images, each one of the first plurality of lambda images corresponding to a different wavelength, and wherein the spectral data collected by the Michelson FTS includes a second plurality of lambda images, each one of the second plurality of lambda images corresponding to a different wavelength.

4. The FTS system of claim 3, wherein the step of combining the selected spectral data includes combining information from the first plurality of lambda images in the first plurality of spatial frequencies with information from the second plurality of lambda images in the second plurality of spatial frequencies.

5. The FTS system of claim 3, wherein each one of the first plurality of lambda images corresponds to a same wavelength as one of the second plurality of lambda images.

6. The FTS system of claim 3, wherein one or more of the first plurality of lambda images do not correspond to a same wavelength as any one of the second plurality of lambda images, wherein the one or more processors are further configured to perform the step of:

synchronizing the first plurality of lambda images with the second plurality of lambda images by providing composite lambda images in one or both of the first plurality of lambda images and the second plurality of lambda images so as to provide pairs of Fourier transformed images from each of the first plurality of lambda images and the second plurality of lambda images corresponding to a same wavelength.

7. The FTS system of claim 1, wherein the one or more processors are further configured to perform the steps of:

generating a Fizeau delta cube of Fizeau interference patterns collected by the Fizeau FTS, each of the Fizeau interference patterns including a plurality of pixels, each of the Fizeau interference patterns corresponding to a different one of a first set of predetermined optical path lengths to which one or more of the plurality of sub-collecting elements of the Fizeau FTS are adjusted, the Fizeau delta cube including a plurality of Fizeau delta columns, each of the plurality of Fizeau delta columns including a corresponding pixel from each of the Fizeau interference patterns;

generating a Michelson delta cube of Michelson interference patterns collected by the Michelson FTS, each of the Michelson interference patterns including a plurality of pixels, each of the Michelson interference patterns corresponding to a different one of a second set of predetermined optical path lengths to which the adjustable optical path of the Michelson FTS is adjusted, the Michelson delta cube including a plurality of Michelson delta columns, each of the plurality of Michelson delta columns including a corresponding pixel from each of the Michelson interference patterns;

generating a Fizeau lambda cube of Fizeau lambda images by Fourier transforming the plurality of Fizeau delta columns to generate a corresponding plurality of Fizeau lambda columns and combining the plurality of Fizeau lambda columns into a Fizeau lambda cube;

generating a Michelson lambda cube of Fizeau lambda images by Fourier transforming the plurality of Michelson delta columns to generate a corresponding plurality of Michelson lambda columns and combining the plurality of Michelson lambda columns into a Michelson lambda cube;

normalizing each of the Fizeau lambda images by dividing an intensity for every pixel in each of the Fizeau lambda images by the modulation transfer function of the Fizeau FTS; and normalizing each of the Michelson lambda images by dividing an intensity for every pixel in each of the Michelson lambda images by the modulation transfer function of the Michelson FTS, wherein the step of selecting spectral data collected by the Fizeau FTS includes selecting one or more regions of each of the Fizeau lambda images for which the modulation transfer function of the Fizeau FTS is above the first threshold level, wherein the step of selecting spectral data collected by the Michelson FTS includes selecting one or more regions of each of the Michelson lambda images for which the modulation transfer function of the Michelson FTS is above the second threshold level, and wherein the step of combining the spectral data includes combining the one or more selected regions of one or more of the Fizeau lambda images with the one or more selected regions of a corresponding one or more of the Michelson lambda images to generate a reconstructed lambda cube of reconstructed lambda images.

8. The FTS system of claim 7, wherein the first set of predetermined optical path lengths and the second set of predetermined optical path lengths include a same number of optical path lengths, each optical path length in the first set and the second set separated from an adjacent optical path length by a same optical path difference.

9. The FTS system of claim 1, wherein the collecting element of the Michelson FTS has an aperture larger than a largest one of the gap distances.

10. A method of restoring low spatial frequency spectral information to an image using a Fizeau Fourier transform spectrometer ("FTS") and a Michelson FTS, the method comprising the steps of:

selecting spectral data collected by the Fizeau FTS corresponding to a first plurality of spatial frequencies for which the Fizeau FTS has a modulation transfer function value above a first threshold level;

selecting spectral data collected by the Michelson FTS corresponding to a second plurality of spatial frequencies for which the Michelson FTS has a modulation transfer function value above a second threshold level; and combining the selected spectral data collected by the Fizeau FTS with the selected spectral data collected by the Michelson FTS.

11. The method of claim 10, wherein the first plurality of spatial frequencies and the second plurality of spatial frequencies include one or more regions of overlapping spatial frequencies.

12. The method of claim 10, wherein the spectral data collected by the Fizeau FTS includes a first plurality of lambda images, each one of the first plurality of lambda images corresponding to a different wavelength, and wherein the spectral data collected by the Michelson FTS includes a second plurality of lambda images, each one of the second plurality of lambda images corresponding to a different wavelength.

13. The method of claim 12, wherein the step of combining the selected spectral data includes combining information from the first plurality of lambda images in the first plurality of spatial frequencies with information from the second plurality of lambda images in the second plurality of spatial frequencies.

14. The method of claim 12, wherein each one of the first plurality of lambda images corresponds to a same wavelength as one of the second plurality of lambda images.

15. The method of claim 12, wherein one or more of the first plurality of lambda images do not correspond to a same wavelength as any one of the second plurality of lambda images, further comprising the step of:

synchronizing the first plurality of lambda images with the second plurality of lambda images by providing composite lambda images in one or both of the first plurality of lambda images and the second plurality of lambda images so as to provide pairs of Fourier transformed images from each of the first plurality of lambda images and the second plurality of lambda images corresponding to a same wavelength.

16. The method of claim 10, further comprising the steps of:

generating a Fizeau delta cube of Fizeau interference patterns collected by the Fizeau FTS, each of the Fizeau interference patterns including a plurality of pixels, each of the Fizeau interference patterns corresponding to a different one of a first set of predetermined optical path lengths to which one or more of the plurality of sub-collecting elements of the Fizeau FTS are adjusted, the Fizeau delta cube including a plurality of Fizeau delta columns, each of the plurality of Fizeau delta columns including a corresponding pixel from each of the Fizeau interference patterns;

generating a Michelson delta cube of Michelson interference patterns collected by the Michelson FTS, each of the Michelson interference patterns including a plurality of pixels, each of the Michelson interference patterns corresponding to a different one of a second set of predetermined optical path lengths to which the adjustable optical path of the Michelson FTS is adjusted, the Michelson delta cube including a plurality of Michelson delta columns, each of the plurality of Michelson delta columns including a corresponding pixel from each of the Michelson interference patterns;

generating a Fizeau lambda cube of Fizeau lambda images by Fourier transforming the plurality of Fizeau delta columns to generate a corresponding plurality of Fizeau lambda columns and combining the plurality of Fizeau lambda columns into a Fizeau lambda cube;

generating a Michelson lambda cube of Fizeau lambda images by Fourier transforming the plurality of Michelson delta columns to generate a corresponding plurality of Michelson lambda columns and combining the plurality of Michelson lambda columns into a Michelson lambda cube;

normalizing each of the Fizeau lambda images by dividing an intensity for every pixel in each of the Fizeau lambda images by the modulation transfer function of the Fizeau FTS; and normalizing each of the Michelson lambda images by dividing an intensity for every pixel in each of the Michelson lambda images by the modulation transfer function of the Michelson FTS, wherein the step of selecting spectral data collected by the Fizeau FTS includes selecting one or more regions of each of the Fizeau lambda images for which the modulation transfer function of the Fizeau FTS is above the first threshold level, wherein the step of selecting spectral data collected by the Michelson FTS includes selecting one or more regions of each of the Michelson lambda images for which the modulation transfer function of the Michelson FTS is above the second threshold level, and wherein the step of combining the spectral data includes combining the one or more selected regions of one or more of the Fizeau lambda images with the one or more selected regions of a corresponding one or more of the Michelson lambda images to generate a reconstructed lambda cube of reconstructed lambda images.

17. The method of claim 16, wherein the first set of predetermined optical path lengths and the second set of predetermined optical path lengths include a same number of optical path lengths, each optical path length in the first set and the second set separated from an adjacent optical path length by a same optical path difference.

18. A machine-readable medium carrying one or more sequences of instructions for restoring low spatial frequency spectral information to an image using a Fizeau Fourier transform spectrometer ("FTS") and a Michelson FTS, wherein execution of the one or more sequences of instructions by one or more processors causes the one or more processors to perform the steps of:

selecting spectral data collected by the Fizeau FTS corresponding to a first plurality of spatial frequencies for which the Fizeau FTS has a modulation transfer function value above a first threshold level;

selecting spectral data collected by the Michelson FTS corresponding to a second plurality of spatial frequencies for which the Michelson FTS has a modulation transfer function value above a second threshold level; and combining the selected spectral data collected by the Fizeau FTS with the selected spectral data collected by the Michelson FTS.

19. The machine-readable medium of claim 18, wherein the first plurality of spatial frequencies and the second plurality of spatial frequencies include one or more regions of overlapping spatial frequencies.

20. The machine-readable medium of claim 18, wherein the spectral data collected by the Fizeau FTS includes a first plurality of lambda images, each one of the first plurality of lambda images corresponding to a different wavelength, and wherein the spectral data collected by the Michelson FTS includes a second plurality of lambda images, each one of the second plurality of lambda images corresponding to a different wavelength.

21. The machine-readable medium of claim 20, wherein the step of combining the selected spectral data includes combining information from the first plurality of lambda images in the first plurality of spatial frequencies with information from the second plurality of lambda images in the second plurality of spatial frequencies.

22. The machine-readable medium of claim 20, wherein each one of the first plurality of lambda images corresponds to a same wavelength as one of the second plurality of lambda images.

23. The machine-readable medium of claim 20, wherein one or more of the first plurality of lambda images do not correspond to a same wavelength as any one of the second plurality of lambda images, and wherein execution of the one or more sequences of instructions by one or more processors causes the one or more processors to further perform the step of:

synchronizing the first plurality of lambda images with the second plurality of lambda images by providing composite lambda images in one or both of the first plurality of lambda images and the second plurality of lambda images so as to provide pairs of Fourier transformed images from each of the first plurality of lambda images and the second plurality of lambda images corresponding to a same wavelength.

24. The machine-readable medium of claim 18, wherein execution of the one or more sequences of instructions by one or more processors causes the one or more processors to further perform the steps of:

generating a Fizeau delta cube of Fizeau interference patterns collected by the Fizeau FTS, each of the Fizeau interference patterns including a plurality of pixels, each of the Fizeau interference patterns corresponding to a different one of a first set of predetermined optical path lengths to which one or more of the plurality of sub-collecting elements of the Fizeau FTS are adjusted, the Fizeau delta cube including a plurality of Fizeau delta columns, each of the plurality of Fizeau delta columns including a corresponding pixel from each of the Fizeau interference patterns;

generating a Michelson delta cube of Michelson interference patterns collected by the Michelson FTS, each of the Michelson interference patterns including a plurality of pixels, each of the Michelson interference patterns corresponding to a different one of a second set of predetermined optical path lengths to which the adjustable optical path of the Michelson FTS is adjusted, the Michelson delta cube including a plurality of Michelson delta columns, each of the plurality of Michelson delta columns including a corresponding pixel from each of the Michelson interference patterns;

generating a Fizeau lambda cube of Fizeau lambda images by Fourier transforming the plurality of Fizeau delta columns to generate a corresponding plurality of Fizeau lambda columns and combining the plurality of Fizeau lambda columns into a Fizeau lambda cube;

generating a Michelson lambda cube of Fizeau lambda images by Fourier transforming the plurality of Michelson delta columns to generate a corresponding plurality of Michelson lambda columns and combining the plurality of Michelson lambda columns into a Michelson lambda cube;

normalizing each of the Fizeau lambda images by dividing an intensity for every pixel in each of the Fizeau lambda images by the modulation transfer function of the Fizeau FTS; and normalizing each of the Michelson lambda images by dividing an intensity for every pixel in each of the Michelson lambda images by the modulation transfer function of the Michelson FTS, wherein the step of selecting spectral data collected by the Fizeau FTS includes selecting one or more regions of each of the Fizeau lambda images for which the modulation transfer function of the Fizeau FTS is above the first threshold level, wherein the step of selecting spectral data collected by the Michelson FTS includes selecting one or more regions of each of the Michelson lambda images for which the modulation transfer function of the Michelson FTS is above the second threshold level, and wherein the step of combining the spectral data includes combining the one or more selected regions of one or more of the Fizeau lambda images with the one or more selected regions of a corresponding one or more of the Michelson lambda images to generate a reconstructed lambda cube of reconstructed lambda images.

25. The machine-readable medium of claim 24, wherein the first set of predetermined optical path lengths and the second set of predetermined optical path lengths include a same number of optical path lengths, each optical path length in the first set and the second set separated from an adjacent optical path length by a same optical path difference.

26. The machine-readable medium of claim 18, wherein the machine-readable medium comprises one or more separate media.

* * * * *